United States Patent
Ziegler

(10) Patent No.: US 7,679,873 B2
(45) Date of Patent: Mar. 16, 2010

(54) DEEP DISCHARGE PROTECTION FOR BATTERY PACKS WITH CELL GROUPS

(75) Inventor: Bernd Ziegler, Hiltenfingen (DE)

(73) Assignee: Hilti Aktiengesellschaft, Schaan (LI)

( * ) Notice: Subject to any disclaimer, the term of this patent is extended or adjusted under 35 U.S.C. 154(b) by 773 days.

(21) Appl. No.: 11/546,836

(22) Filed: Oct. 11, 2006

(65) Prior Publication Data

US 2007/0090807 A1 Apr. 26, 2007

(30) Foreign Application Priority Data

Oct. 13, 2005 (DE) .................. 10 2005 000 139

(51) Int. Cl.
*H02H 3/00* (2006.01)

(52) U.S. Cl. .................................... 361/82

(58) Field of Classification Search ............. 361/82
See application file for complete search history.

(56) References Cited

U.S. PATENT DOCUMENTS 4,394,741 A * 7/1983 Lowndes ............ 340/825.52

* cited by examiner

*Primary Examiner*—Stephen W Jackson
(74) *Attorney, Agent, or Firm*—Abelman, Frayne & Schwab

(57) ABSTRACT

A method of preventing deep discharge of the battery pack (1') with series-connected cell groups (2a, 2b) by polarity reversal of an individual weakest cell (3), includes a difference measurement step which is repeated over time for detecting an event indicative of a probable reversal of polarity in which the change over time of the voltage difference between two cell groups (2a, 2b) having identical numbers of cells is checked to determine if the change in the voltage difference has exceeded an amount corresponding to a difference threshold value which reliably distinguishes a fast polarity reversal of an individual weakest cell (3) in exactly one cell group (2a, 2b) from the slow fluctuation of the voltage difference between two cell groups (2a, 2b) during an ordinary discharge characteristic curve without polarity reversal of an individual weakest cell (3); and a battery pack (1') and a battery-powered hand-held power tool (7) with a monitoring circuit (5') for implementing the method.

9 Claims, 2 Drawing Sheets

DEEP DISCHARGE PROTECTION FOR BATTERY PACKS WITH CELL GROUPS

BACKGROUND OF THE INVENTION

1. Field of the Invention

The present invention relates to deep discharge protection for battery packs with cell groups, in particular for battery-powered hand-held power tools.

2. Description of the Prior Art

According to European Publication EP743736, a battery-powered hand-held power tool has a monitoring circuit that is integrated in the motor control for monitoring the charge state of the battery pack and which switches off the battery pack and/or the battery-powered hand-held power tool when a predetermined threshold value is not reached.

In a deep discharge of a battery pack, the cell with the smallest capacity reverses its polarity. Accordingly, an individual deep discharge of one cell can destroy an entire battery pack. In order to prevent this, every individual cell can be checked for a deep discharge protection by a voltage monitoring device to determine whether the voltage has fallen below a threshold voltage. However, this would be uneconomical in battery packs having many cells because of the high wiring costs. Therefore, usually the absolute group voltage over a plurality of cell groups is checked so as to reduce expenditure on wiring to an economically reasonable, smaller quantity of cell groups. However, individual cells cannot be checked directly in this way, so that the reversal of polarity of individual cells is difficult to prevent.

Further, according to U.S. Pat. No. 6,020,743, the change in the voltage difference over time between two series-connected cell groups having an identical quantity of cells is determined in a battery pack during the charging process. A charging process based on a charging of the battery pack that increases over time is unsuitable for a deep discharge protection during the discharge process with charging by a consumer that decreases over time.

SUMMARY OF THE INVENTION

Accordingly, it is an object of the invention to provide a deep discharge protection for battery packs with cell groups which reliably prevents a reversal of polarity of individual cells during the discharge process.

This and other objects of the present invention, which will become apparent hereinafter, are achieved by providing a method of a deep discharge protection for battery packs with series-connected cell groups that reliably prevents deep discharge of the battery pack by polarity reversal of an individual weakest cell and that includes a difference measurement step which is repeated over time for detecting an event indicative of a probable reversal of polarity in which the change over time of the voltage difference between two cell groups having identical numbers of cells is checked to determine if the change in the voltage difference has exceeded an amount corresponding to a difference threshold value which reliably distinguishes a fast polarity reversal of an individual weakest cell in exactly one cell group from the slow fluctuation of the voltage difference between two cell groups during an ordinary discharge characteristic curve without polarity reversal of an individual weakest cell.

Since the probability of a simultaneous polarity reversal of an individual cell in each cell group when both cell groups of the battery pack are under identical load is extremely small, the (incipient) polarity reversal of exactly one cell per battery pack can be reliably detected in the reversal circuit by evaluating a difference measurement over time. Also, since the polarity reversal process of a cell is itself a relatively fast process but is nevertheless continuous with respect to time, further discharge of the battery pack can accordingly be prevented by the deep discharge protection already within the range of the polarity reversal that is still reversible, and can recover again independently or by applying corresponding known revitalization methods.

The difference threshold is advantageously between 0.2 V and 1.0 V (regardless of the quantity of cells or cell technology such as nickel-metal-hydride (NiMH), nickel-cadmium (NiCd), lithium-ion (Li-ion), or lithium-polymer (Li-polymer)), so that slow fluctuations in the voltage differences between two groups of cells can be suppressed with sufficient reliability but an incipient reversal of polarity is reliably detected while still within the reversible range.

The difference measurement step is advantageously repeated periodically with respect to time at a difference step interval between 0.1 s and 10 s, or more advantageously 1 s, so that an incipient polarity reversal proceeding is detected relatively rapidly in a timely manner while still within the reversible range.

In an advantageous manner, the total voltage of the battery pack and/or the individual group voltages of the two groups of cells are/is checked in an absolute measurement step which is repeated periodically with respect to time for detection of an event indicative of a probable reversal of polarity to determine whether the voltage has fallen below an absolute threshold value, so that, in addition, an integrally increased probability of polarity reversal is reliably prevented.

In a conditional disconnect step which follows the difference measurement step and which optionally follows the absolute measurement step, the battery pack is advantageously electrically disconnected from the consumer upon the occurrence of an event indicating a probable reversal of polarity so that a deep discharge is prevented independent from the interposition of the user.

The monitoring circuit associated with the deep discharge protection is advantageously arranged in its entirety inside the battery pack and, further advantageously, is integrated in a microcontroller so that it can be produced in bulk in an economical manner.

The battery pack advantageously has two, or further advantageously exactly two, cell groups which are connected in series, each having an identical number of cells between 5 and 20, further advantageously exactly 15, so that the high operating voltages, e.g., 18 V or 36 V, required for the operation of efficient battery-powered hand-held power tools, are provided with cell voltages between 0.5 V and 4.0 V (Li-ion) depending upon type.

Alternatively, the monitoring circuit associated with the deep discharge protection is integrated in its entirety in the motor control of a battery-powered hand-held power tool that includes an associated battery pack with an average voltage contact which is arranged electrically between two, further advantageously exactly two, cell groups which are connected in series and each of which has the same quantity of cells, and an electric driving motor. In this case, a power switching element (relay or power semiconductor) of the motor control can be used and, accordingly, simple battery packs without their own deep discharge protection, can be used.

The novel features of the present invention, which are considered as characteristic for the invention, are set forth in the appended claims. The invention itself, however, both as to its construction and its mode of operation, together with additional advantages and objects thereof, will be best under-

DETAILED DESCRIPTION OF THE PREFERRED EMBODIMENT

Figure 1:
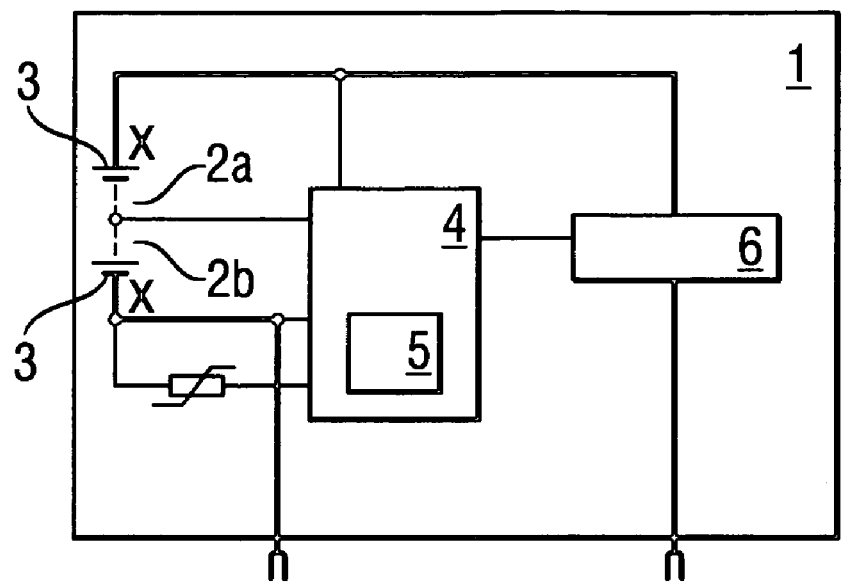
FIG. 1 a diagrammatic view of a battery pack with integrated deep discharge protection.

According to FIG. 1, an individual battery pack 1 with exactly two cell groups 2a, 2b which are connected in series, with each group having X=15 individual nickel-cadmium (NiCd) cells 3 with a cell voltage $U_Z$ of 1.2 V (0.5 V to 1.2 V depending on the current load $I_L$) (FIG. 3), includes a monitoring circuit 4, which is arranged in its entirety inside the battery pack 1, in the form of a microcontroller with a program-controlled method algorithm 5 for deep discharge protection, and with a power switching element 6 in the form of an integrated semiconductor power switch.

Figure 2:
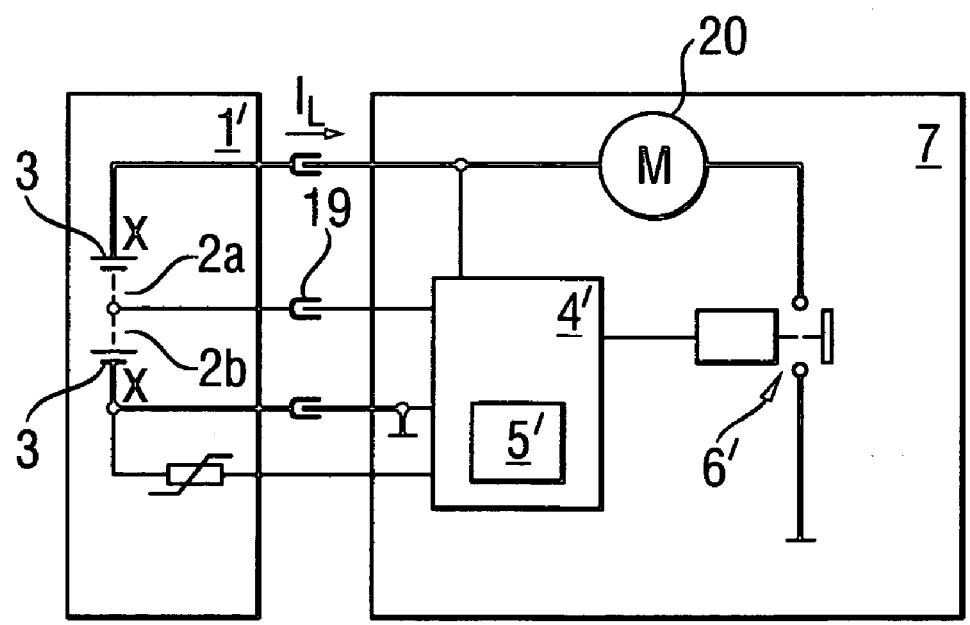
FIG. 2 a diagrammatic view of a battery-powered hand-held power tool with integrated deep discharge protection.

Alternatively, according to FIG. 2, a battery pack 1' with an average voltage contact 19 which taps the intermediate voltage between exactly two series-connected cell groups 2a, 2b, with each group having X=15 individual nickel-cadmium (NiCd) cells 3 with a cell voltage $U_Z$ of 1.2 V, is connected to a 36-V battery-powered hand-held power tool 7, with an electric motor 20 as consumer. The monitoring circuit 4' which acts as deep discharge protection is formed in its entirety by the microcontroller-controlled motor control of the battery-powered hand-held power tool 7 with a program-controlled method algorithm 5' and with an electronically controlled power switching element 6' in the form of a relay.

Figure 3:
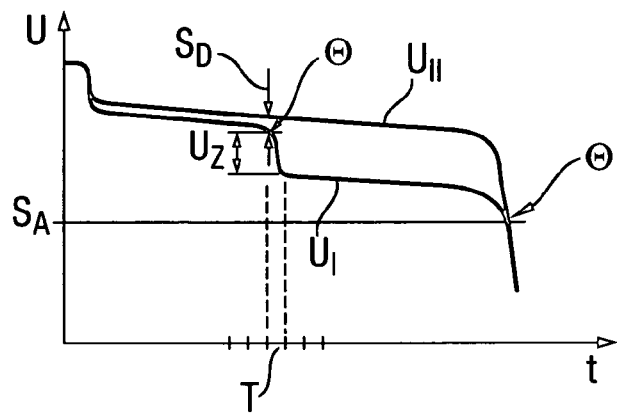
FIG. 3 a discharge diagram of a battery pack.

According to the voltage U/time t graph shown in FIG. 3 for a discharge process, the method for a deep discharge protection for battery packs 1' (FIG. 1, FIG. 2) with two series-connected cell groups 2a, 2b (FIG. 1, FIG. 2), each having the same quantity of cells, for reliably preventing deep discharge through polarity reversal of an individual weakest cell 3 (FIG. 1, FIG. 2) is based on the timely detection of an event Θ indicative of a probable reversal of polarity. The first group voltage $U_I$ shows a fast polarity reversal process which is caused by polarity reversal of a weakest cell 3 (FIG. 1, FIG. 2) and which has a fast voltage change corresponding to the cell voltage $U_Z$. An event Θ indicating a probable polarity reversal is detected when the fast time change of the difference of the two group voltages $U_I$, $U_{II}$, each associated with a cell group 2a, 2b (FIG. 1, FIG. 2), within a difference step interval T=1 s following one after the other periodically in time quantitatively exceeds a difference threshold $S_D$=0.8 V (inversely proportional depending on current load $I_L$), or when one of the two gradually changing group voltages $U_I$, $U_{II}$ falls below the absolute threshold $S_A$=0.7 V×cells 3/cell group 2a, 2b absolutely.

Figure 4:
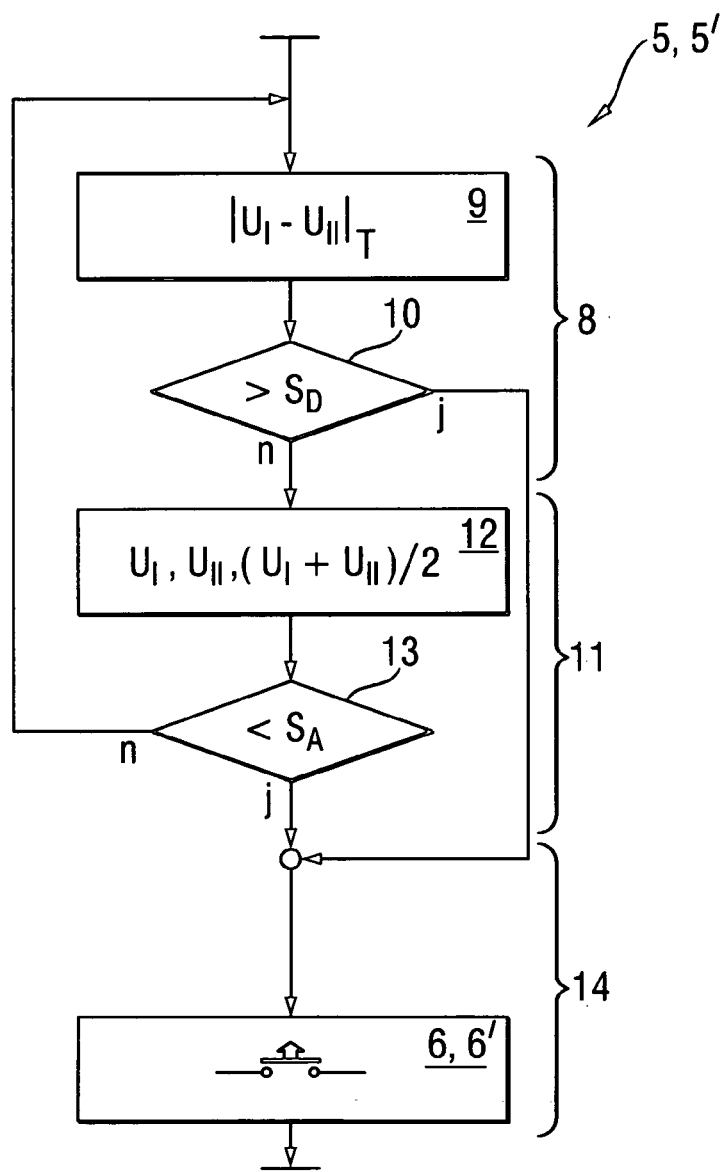
FIG. 4 a flow chart illustrating a method for deep discharge protection.

According to FIG. 4, the program-controlled method algorithm 5' (FIG. 1, FIG. 2) for a deep discharge protection contains a difference measurement step 8 which is repeated in time multiple times within a program loop for detecting an event Θ indicative of a probable reversal of polarity. In this difference measurement step 8, the time change in the amount of the difference of the two group voltages $U_I$, $U_{II}$ within a difference time interval T following one after the other periodically over time, is determined in a difference module 9 and is compared in a difference comparator 10 with the difference threshold value $S_D$, wherein the event Θ is signaled when this difference threshold value $S_D$ is exceeded. Further, in an absolute measurement step 11 which is repeated over time for the detection of an event Θ indicating a probable polarity reversal, the group voltages $U_I$, $U_{II}$ of each of the two cell groups 2a, 2b (FIG. 1, FIG. 2) and one half of their sum are checked independently in an absolute value comparator 13 to determine whether the voltage has fallen below an absolute threshold value $S_A$; and if so, the event Θ is signaled. In a subsequent disconnection step 14 which is carried out conditionally only when an event Θ has been signaled, the battery pack 1' (FIG. 1, FIG. 2) is electrically disconnected from the consumer (battery-powered hand-held power tool 7 in FIG. 2) by a switching signal to the power switching element 6' (FIG. 2) of the battery pack 1' (FIG. 1, FIG. 2).

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A method of preventing deep discharge of the battery pack (1) with series-connected cell groups (2a, 2b) by polarity reversal of an individual weakest cell (3), comprising a difference measurement step (8) which is repeated over time for detecting an event (Θ) indicative of a probable reversal of polarity and in which a change over time of a voltage difference between two cell groups (2a, 2b) having identical numbers of cells is checked to determine if the change in the voltage difference has exceeded an amount corresponding to a difference threshold value ($S_D$) that reliably distinguishes a fast polarity reversal of an individual weakest cell (3) in exactly one cell group (2a, 2b) from a slow fluctuation of a voltage difference between two cell groups (2a, 2b) during an ordinary discharge characteristic curve without polarity reversal of an individual weakest cell (3).

2. A method according to claim 1, wherein the difference threshold value ($S_D$) lies in the range between 0.5 V and 1.0 V.

3. A method according to claim 1, wherein the difference measurement step (8) is repeated periodically at a difference step interval (T) between 0.1 s and 10 s.

4. A method according to claim 1, wherein a total voltage of the battery pack (1) and/or the group voltages ($U_I$, $U_{II}$) of the two cell groups (2a, 2b) are/is checked in a further absolute measurement step (11) which is repeated over time for detection of an event (Θ) indicative of a probable reversal of polarity to determine whether the voltage has fallen below an absolute threshold value ($S_A$).

5. A method according to claim 1, wherein the battery pack (1) is electrically disconnected from the consumer in a conditional disconnect step (14) which follows the difference measurement step (8) when the event (Θ) indicating a probable reversal of polarity occurs.

6. A method according to claim 5, wherein the battery pack (1) is electrically disconnected from the consumer in a conditional disconnect step (14) which follows the absolute measurement step (8) when the event (Θ) indicating a probable reversal of polarity occurs.

7. A battery pack, comprising two cell groups (2a, 2b) which are connected in series, each group having an identical quantity of cells (3); and a monitoring circuit (5) arranged in its entirety inside the battery pack for preventing deep discharge of the battery pack (1) with series-connected cell groups (2a, 2b) by polarity reversal of an individual weakest cell (3) by carrying out a difference measurement step (8) which is repeated over time for detecting an event ($\Theta$) indicative of a probable reversal of polarity and in which a change over time of a voltage difference between two cell groups (2a, 2b) having identical numbers of cells is checked to determine if the change in the voltage difference has exceeded an amount corresponding to a difference threshold value ($S_D$) that reliably distinguishes a fast polarity reversal of an individual weakest cell (3) in exactly one cell group (2a, 2b) from a slow fluctuation of a voltage difference between two cell groups (2a, 2b) during an ordinary discharge characteristic curve without polarity reversal of an individual weakest cell (3).

8. A battery pack according to claim 6, wherein a number of cells (3) common to each cell group (2) is between 5 and 20.

9. A battery-powered hand-held power tool, comprising a battery pack (1') with an average voltage contact (19) which is arranged electrically between two cell groups (2a, 2b) which are connected in series and each have the same number of cells (3); an electric driving motor (20); and a monitoring circuit (5') for preventing deep discharge of the battery pack (1) with the series-connected cell groups (2a, 2b) by polarity reversal of an individual weakest cell (3), by carrying out a difference measurement step (8) which is repeated over time for detecting an event ($\Theta$) indicative of a probable reversal of polarity and in which a change over time of a voltage difference between two cell groups (2a, 2b) having identical numbers of cells is checked to determine if the change in the voltage difference has exceeded an amount corresponding to a difference threshold value ($S_D$) that reliably distinguishes a fast polarity reversal of an individual weakest cell (3) in exactly one cell group (2a, 2b) from a slow fluctuation of a voltage difference between two cell groups (2a, 2b) during an ordinary discharge characteristic curve without polarity reversal of an individual weakest cell (3), the monitoring circuit (5') being integrated in its entirety within a motor control of the electric motor (20).

\* \* \* \* \*